(12) United States Patent
Vohra et al.

(10) Patent No.: US 10,708,261 B2
(45) Date of Patent: Jul. 7, 2020

(54) SECURE GATEWAY ONBOARDING VIA MOBILE DEVICES FOR INTERNET OF THINGS DEVICE MANAGEMENT

(71) Applicant: VMware, Inc., Palo Alto, CA (US)

(72) Inventors: Meenakshi Vohra, Cupertino, CA (US); Glen McCready, Palo Alto, CA (US); Greg Bollella, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 242 days.

(21) Appl. No.: 15/973,120

(22) Filed: May 7, 2018

(65) Prior Publication Data

US 2019/0342284 A1 Nov. 7, 2019

(51) Int. Cl.
*H04L 29/06* (2006.01)
*G06K 9/58* (2006.01)

(52) U.S. Cl.
CPC .......... *H04L 63/0853* (2013.01); *G06K 9/58* (2013.01); *H04L 63/029* (2013.01); *H04L 63/083* (2013.01); *H04L 63/0823* (2013.01)

(58) Field of Classification Search
CPC .............. H04L 63/0853; H04L 63/029; H04L 63/0823
See application file for complete search history.

(56) References Cited

U.S. PATENT DOCUMENTS

| | | | | |
|---|---|---|---|---|
| 8,213,915 B1 * | 7/2012 | Upadhyay | | H04L 67/145 455/414.1 |
| 9,660,982 B2 * | 5/2017 | Hitchcock | | G06F 21/00 |
| 10,382,203 B1 * | 8/2019 | Loladia | | H04L 9/14 |
| 2002/0108121 A1 * | 8/2002 | Alao | | H04N 21/812 725/110 |
| 2013/0346610 A1 * | 12/2013 | Liu | | H04L 41/0213 709/225 |
| 2014/0092907 A1 * | 4/2014 | Sridhar | | H04L 12/4641 370/392 |
| 2015/0032627 A1 * | 1/2015 | Dill | | G06Q 20/385 705/44 |
| 2015/0121470 A1 * | 4/2015 | Rongo | | H04W 4/70 726/4 |
| 2018/0054327 A1 * | 2/2018 | Ameling | | H04L 12/66 |
| 2018/0278607 A1 * | 9/2018 | Loladia | | H04L 63/0823 |
| 2018/0374056 A1 * | 12/2018 | Murray | | G06Q 10/107 |
| 2019/0095505 A1 * | 3/2019 | Young | | G06Q 10/0833 |

(Continued)

*Primary Examiner* — Ali Shayanfar
(74) *Attorney, Agent, or Firm* — Thomas | Horstemeyer, LLP

(57) ABSTRACT

Disclosed are various examples for enrollment of gateway enrollment for Internet-of-Things (IoT) device management using a client device. In one example, an onboarding token is retrieved using a request for the onboarding token. The request is authenticated based on user credentials. A gateway account is created using a request to create the gateway account that is transmitted to the management service. The request to create the gateway account includes a gateway identifier. The request is authenticated based on the onboarding token. Gateway credentials for the gateway account are relayed from the management service to the gateway. The gateway credentials authenticate communications between the gateway and the management service. The gateway credentials are concealed from users of the client device.

20 Claims, 5 Drawing Sheets

(56) References Cited

U.S. PATENT DOCUMENTS

| | | | |
|---|---|---|---|
| 2019/0149402 A1* | 5/2019 | Ramachandran | H04L 12/66 709/220 |
| 2019/0230063 A1* | 7/2019 | McCready | H04W 12/0609 |
| 2019/0238524 A1* | 8/2019 | Copty | H04L 9/0838 |
| 2019/0327112 A1* | 10/2019 | Nandoori | H04L 63/0272 |
| 2019/0342630 A1* | 11/2019 | Li | H04L 12/66 |

* cited by examiner

SECURE GATEWAY ONBOARDING VIA MOBILE DEVICES FOR INTERNET OF THINGS DEVICE MANAGEMENT

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

Client devices, edge devices, and other devices can be required to authenticate with the management service to ensure secure management communications. For example, a client device such as a cellular phone, a tablet, a computer, or another device can authenticate with the management service using credentials created by or otherwise associated with an end user of the client device. However, a gateway or edge device might not be associated with an end user or their credentials in the manner that a cellular phone, a tablet, or a computer is associated with an end user. One solution might be to allow an administrator to be considered an end user for the gateway, but this solution is problematic. For instance, it can be a security risk for an administrator to create and know the credentials used to authenticate a gateway with the management service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
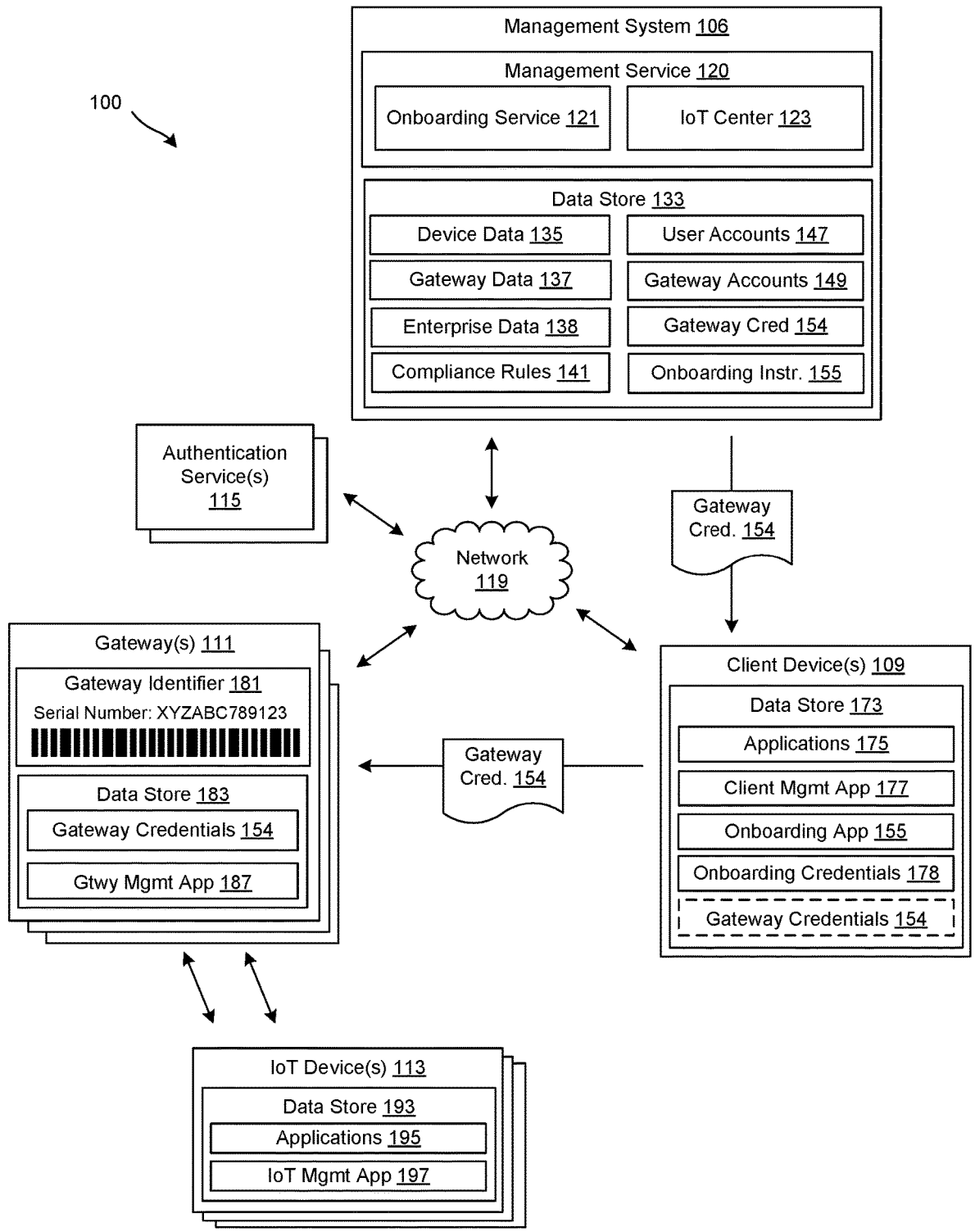
FIG. 1 is a drawing of an example of a networked environment including elements involved in gateway onboarding.

The present disclosure relates to gateway enrollment via mobile devices for Internet-of-Things (IoT) device management. In order to provide data and interact with the physical world, IoT devices can connect to a network through a gateway or another edge device. A management service can enroll and manage the gateway in order to ensure secure interaction with the IoT devices. The gateway can authenticate with the management service using associated credentials for communications between the gateway and the management service. As discussed above, it can be a security risk for an administrator to create and know the credentials used to authenticate the gateway with the management service. Further, it can be inefficient and inconvenient for a user to enter credentials each time a gateway is enrolled. However, examples described herein describe a management service that can solve these problems by securely enrolling a gateway using a mobile device. By using a mobile device, the onboarding process can be more efficient for the user by using onboarding credentials to authenticate the client device with the management service for onboarding of multiple gateways. The process can also be more secure because an onboarding application of the mobile device can deliver the gateway credentials to a gateway while concealing the gateway credentials from users.

In some examples, an onboarding token can be retrieved using a request for the onboarding token. The request can be authenticated based on user credentials associated with a user account with a management service. A gateway account can be created using a request to create the gateway account that is transmitted to the management service. The request to create the gateway account can include a gateway identifier that uniquely identifies a gateway. The request can be authenticated based on the onboarding token. Gateway credentials for the gateway account can be relayed from the management service to the gateway. The gateway credentials can authenticate communications between the gateway and the management service. Gateway credentials can include a username and password associated with the gateway account. In some cases, the gateway credentials also include a certificate associated with the management service. The gateway credentials can be concealed from users of the client device.

Image data that shows the gateway can be captured using a camera device of the client device. The image data can be analyzed to identify the gateway identifier of the gateway. The gateway identifier can be identified based on a machine-readable identifier in the image data that shows the gateway. The gateway identifier can be encoded in the machine-readable identifier. Alternatively, the gateway identifier can be identified based on optical character recognition of the image data that shows the gateway. Further, the gateway identifier can be entered through a user interface element generated in a prompt in a user interface.

The gateway credentials can be stored in a data store of the client device. The gateway credentials can be removed or deleted from the data store upon a detection of an event. The event can include at least one of transmission of the gateway credentials to the gateway, a confirmation from the gateway that the gateway credentials are received by the gateway, or a confirmation from the management service that the gateway has checked in using the gateway credentials.

In some situations, the onboarding token is determined to be expired based on timeout data associated with the onboarding token. An updated onboarding token can be obtained based on a certificate associated with a user identifier and a device identifier that uniquely identifies the client device. Alternatively, a user interface element to re-obtain user credentials can be generated, and the updated onboarding token can be obtained based on the re-obtained user credentials.

With reference to FIG. 1, shown is an example of a networked environment 100. The networked environment 100 can include a management system 106, client devices 109, gateways 111, Internet-of-Things (IoT) devices 113, and authentication services 115 in communication with one another over a network 119. Internet-of-Things (IoT) devices 113 can connect to the network 119 through the gateway 111. The components of the networked environment 100 can be utilized to enroll the gateway 111 with the management service 120 and securely provide gateway credentials 154 to the gateway 111 for authentication with the management service 120. The gateway 111 can communicate with the management service 120 for management of the IoT devices 113 that connect to the network 119 through the gateway 111.

The authentication services 115 can be provided or hosted by the management system 106 or can be third party authentication services 115 utilized by the management system 106. Accordingly, the authentication services 115 can be associated with the management system 106 and can be considered part of the management system 106. Authentication services 115 can include identity providers that generate and validate tokens such as hash message authentication code (HMAC) tokens, OAuth tokens, or Security Assertion Markup Language (SAML) tokens. Authentication services 115 can also include an Online Certificate Status Protocol (OCSP) service or certificate revocation list (CRL) service.

The network 119 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120, an onboarding service 121, an IoT Center 123, as well as other applications, services, processes, systems, engines, or functionality not discussed in detail herein. The onboarding service 121 and the IoT Center 123 can each be considered a module, component, or process of the management service 120 and can each be executed on the same computing device or can each be executed on a different computing device. The management service 120, the onboarding service 121, and the IoT Center 123 can each be stored in the data store 133 of the management system 106. While referred to generally as the management service 120 herein, the various functionalities and operations discussed can be provided by the management service 120 or any of its components, including the onboarding service 121 and the IoT Center 123.

The data store 133 can include any storage device or medium that can contain, store, or maintain the instructions, logic, or applications described herein for use by or in connection with the instruction execution system. The data store 133 can be a hard drive or disk of a host, server computer, or any other system providing storage capability. While referred to in the singular, the data store 133 can include a plurality of storage devices that are arranged in one or more hosts, server banks, computer banks, or other arrangements. The data store 133 can include any one of many physical media, such as magnetic, optical, or semiconductor media. More specific examples include solid-state drives or flash memory.

The data store 133 can include memory of the management system 106, mass storage resources of the management system 106, or any other storage resources on which data can be stored by the management system 106. The data stored in the data store 133 can include, for example, management data including device data 135, enterprise data 138, compliance rules 141, user accounts 147, gateway accounts 149, gateway credentials 154, gateway onboarding instructions 155, as well as other data.

The data stored in the data store 133 can be associated with the operation of the various applications and/or functional entities described. Client devices 109, gateways 111, and IoT devices 113 can be identified within the device data 135 by one or more of a device identifier, a unique device identifier (UDID), a media access control (MAC) address, an internet protocol (IP) address, or another identifier that uniquely identifies a device with respect to other devices. The device data 135 can include gateway data 137 associated with gateways 111 and other edge systems or edge devices through which IoT devices 113 can connect to the network 119. The gateway data 137 can also include specifications and for each gateway 111, a type of gateway for each gateway 111, a device identifier for each gateway 111, and other information. Specifications for the gateway 111 can include hardware configurations including a chipset utilized by the gateway, a performance or capacity of the gateway 111, and software configurations including a version of the gateway management application 187 installed, a model identifier of the gateway 111, and other information.

Device data 135 can include data associated with a configuration of each client device 109, gateway 111, and IoT device 113, and can include an identifier of the client device 109, gateway 111, or IoT device 113. The identifier can be a serial number, media access control (MAC) address, other network address, or another device identifier. In addition, the device data 135 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data 138 while a client device 109, gateway 111, or IoT device 113 designated as "not enrolled," or having no designation, can be denied access to the enterprise data 138.

Additionally, device data 135 can include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts 147 or service accounts associated with each of the devices, the physical locations of each of the devices, the network to which each of the devices is connected, and other information describing the current state of each of the devices. While a user account 147 can be associated with a particular person, in some cases a user account can be unassociated with any particular person, and can nevertheless be utilized for client devices 109, gateways 111, or IoT devices 113 that provide certain functionalities, such as automatic functionalities. For example, a gateway 111 can be associated with a service account or a gateway account 149 that is unassociated with any person.

Device data 135 can also include data pertaining to user groups. An administrator can specify one or more of the client devices 109, gateways 111, and IoT devices 113 as belonging to a user group. The user group can refer to a group of user accounts 147, which can include gateway accounts 149. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department.

Compliance rules 141 can include, for example, configurable criteria that must be satisfied for an enrolled one of the client devices 109, gateways 111, and IoT devices 113 to be "in compliance" with the management service 120. The compliance rules 141 can be based on a number of factors including geographical location, activation status, enrollment status, authentication data including authentication data obtained by a device registration system, time, and date, and network properties, among other factors associated with each device. The compliance rules can also be determined based on a user account associated with a user. In some cases, a gateway 111 can be unassociated with a user, but can nevertheless be associated with a service account, a gateway account 149, or another user account 147 that is unassociated with a user.

The user profile can be identified by obtaining authentication data associated with the client device 109. The user profile can be associated with compliance rules that are further determined based on time, date, geographical location and network properties detected by the client device 109. The user profile can further be associated with a user group, and compliance rules 141 can be determined in view of the user group.

Compliance rules 141 can include predefined constraints that must be met in order for the management service 120, or other applications, to permit access to the enterprise data 138 or other features of the client device 109. The management service 120 can communicate with a management application or another application executable on the client devices 109, gateways 111, and IoT devices 113 to determine whether states exist that do not satisfy one or more compliance rules 141. Some of these states can include, for example, a virus or malware being detected on the device; installation or execution of a blacklisted application; a device being "rooted" or "jailbroken," where root access is provided to a user of the device. Additional states can include the presence of particular files, questionable device configurations, vulnerable versions of client applications, or other vulnerability, as can be appreciated. The management service 120 can communicate with the gateway management application 187 to determine whether states exist that do not satisfy one or more compliance rules 141 regarding the IoT devices 113. The gateway management application 187 can receive IoT device 113 communications, for example from the IoT management application 197. The IoT device 113 communications can include status data for the IoT device 113. The gateway management application 187 can pass or otherwise transmit the status data to the management service 120 for evaluation of the compliance rules 141. The management service 120 can also transmit all or a portion of the compliance rules 141 to the gateway 111. The gateway 111 can store the compliance rules 141 in the data store 183. The gateway 111 can then determine or evaluate whether states exist, for example on the IoT devices 113, that do not satisfy one or more compliance rules 141, for example, without passing or transmitting the status data to the management service 120. In any case, determining that states exist in the IoT device 113 that do not satisfy one or more compliance rules 141 can trigger an action or command that causes the IoT device 113 to be in compliance with the compliance rules 141. In some examples, the compliance rules 141 include one or more commands that bring the IoT device 113 into compliance.

Gateway credentials 154 can be credentials associated with the gateway account 149, and can enable or permit communications with the IoT Center 123 of the management service 120. The gateway credentials 154 can be provided to the gateway 111 for authentication with the management service 120 and the IoT Center 123 for management and IoT operations. In some situations, the gateway credentials 154 are not provided to or exposed to any user during the enrollment process. The gateway credentials 154 can include a username and a password. The username and password of the gateway credentials can be generated by the management service 120. The gateway credentials 154 can also include a token, a certificate, or other parameters for authentication of the gateway with the management service 120. The token of the gateway credentials can include a hash message authentication code (HMAC) token, an OAuth token, or a Security Assertion Markup Language (SAML) token. The token can be provided by the management service 120 or an authentication service 115 such as an identity provider. In some examples, the certificate can be a management certificate associated with the management service 120. The management certificate can be verified using an Online Certificate Status Protocol (OCSP) server or by comparison to a certificate revocation list (CRL). The OCSP server or CRL can be part of the management service 120 or an authentication service 115.

Gateway onboarding instructions 155 can be generated and stored by the management service 120. The gateway onboarding instructions 155 can be an application such as a gateway onboarding application or the client management application 177. The gateway onboarding instructions 155 can also be a module or portion of another application, that can be used to upgrade or update the application with gateway onboarding functionalities. The onboarding instructions 155 can utilize the onboarding credentials 178 during an onboarding process in order to authenticate communications between the client device 109 and the management system 106. The onboarding credentials 178 can include an onboarding token and/or an onboarding certificate. In some cases, the onboarding certificate can be a user certificate associated with at least one of a user identifier associated with a user account 147 and a device identifier that uniquely identifies a client device 109. The management system 106 can provide gateway credentials 154 to the onboarding instructions 155, which can conceal the gateway credentials 154 from a user of the client device 109. The onboarding instructions 155 can provide the gateway credentials 154 to the gateway 111 and delete the gateway credentials 154 from the client device 109.

The management service 120 can oversee the management of devices including the client devices 109 and gateways 111. The management service 120 can oversee the operation of the devices enrolled with the management service 120 as well as manage enrollment and un-enrollment operations for the devices, for example, using the onboarding service 121. The management service 120 can provide functionality using application program interfaces (APIs). To this end, an API of the management service 120 can provide enrollment information regarding a device, such as whether the device is enrolled with the management service 120. APIs or API calls can be provided for other functionalities of the new management service 120 as discussed herein.

In some embodiments, an enterprise, such as one or more companies or other organizations, can operate the management service 120 to oversee or manage the operation of the client devices 109 of its employees, contractors, customers, students, or other users having user accounts with the enterprise. The enterprise can also operate the management service 120 to oversee or manage the operation of the gateways 111 associated with the enterprise, as well as devices that connect to the network 119 through the gateways 111, including IoT devices 113. An enterprise can be any customer of the management service 120. The management service 120 can remotely configure the client device 109 by interacting with an agent application, a client management application 177 or another application 175 executed on the client device 109. Likewise, the management service 120 can remotely configure the gateway 111 by interacting with an agent application, a gateway management application 187, or another application executed on the gateway 111. The gateway management application 187 can include a number of components including an IoT Agent 189 for management and communication with IoT devices 113.

The management service 120 can transmit various software components to the gateway 111 which are then installed, configured, or implemented by the gateway management application 187. Such software components can include, for example, additional client applications, resources, libraries, drivers, device configurations, or other similar components that require installation on the gateway 111 as specified by the enterprise or an administrator of the management service 120. The management service 120 can further cause policies to be implemented on a gateway 111. Policies can include, for example, restrictions or permissions pertaining to capabilities of a gateway 111. For instance, policies can require certain hardware or software functions of the gateway 111 to be enabled or be disabled during a certain time period or based on a particular location. Such policies can be implemented by the gateway management application 187. The management service 120 can also cause the gateway 111 to activate or enroll IoT devices 113, for example, by placing at least one command associated with an activation schedule for one or more of the IoT devices in a command queue of the gateway 111. The gateway 111 can check in with the management service 120, retrieve the command from the command queue provided by the management service 120, and implement the command using the gateway management application 187.

Likewise, the management service 120 can transmit various software components to the client device 109 which are then installed, configured, or implemented by the client management application 177. Such software components can include, for example, additional applications 175, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the client management application 177.

The management service 120 can also transmit various software components to the IoT device 113 which are then installed, configured, or implemented by the IoT management application 197. Such software components can include, for example, additional applications 195, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location. Such policies can be implemented by the IoT management application 197. The management service 120 can transmit the software components to the IoT device 113 through the gateway 111. The management service 120 can have a command queue storing at least one action to perform on the particular gateway 111 upon check-in of the gateway 111. For instance, the gateway management application 187 can cause the gateway 111 to check-in with the management service 120, identify an action in the command queue, and perform or implement the action. An action can be the installation of a profile, or the execution of a command or other actions to install software components, implement policies, update the gateway management application 187, install a software product, or implement other commands. In some cases, the gateway management application 187 can cause a check-in of the gateway 111 periodically, on a schedule, or upon an event, such as changing a state of the gateway 111, installing an application on the gateway 111, upon detecting an IoT device 113, or upon receiving a request to access the network 119 or another request from an IoT device 113. In one example, the contents of the command queue can include a command that the gateway management application 187 causes to be executed on the gateway 111. In another example, the contents of the command queue can include a resource, an application, or an application update that the gateway management application 187 causes to be installed on the gateway 111, which the gateway may access through a specified uniform resource locator (URL) in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management application 187 can cause the gateway 111 to check-in with the management service 120. The gateway management application 187 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The onboarding service 121 can oversee the enrollment of gateway 111 with the management service 120. In some instances, the onboarding service 121 can include a web application that can be accessed by the client device 109 through the network 119 to perform functionality related to secure enrollment of gateway 111 and secure delivery of credentials to the gateway 111. The onboarding service 121 instructions for other functionality can be stored in a data store 133 of the management system 106. The data store 133 can include memory of the management system 106, mass storage resources of the management system 106, or any other storage resources on which data can be stored by the management system 106.

The onboarding service 121 can provide operations associated with enrollment of the gateway 111 with the management service 120. For example, the onboarding service 121 can provide an endpoint such as an API, network site, or network location for enrollment of the gateway 111 with the management service 120. The onboarding service 121 can receive a request to enroll the gateway 111 that includes onboarding credentials 178. The onboarding service 121 can then perform enrollment operations. In the various examples, the enrollment operations can include one or more of creating a gateway account 149 associated with the gateway 111, generating gateway credentials 154 for authentication of the gateway 111 with the management service 120 for IoT device 113 management, associating the gateway credentials 154 with multiple accounts and functionalities of the management service 120, setting or changing ACL rules associated with the gateway account 149, and securely transmitting the gateway credentials 154 to the gateway 111.

The IoT Center 123 can oversee management of gateways 111, routers, routing switches, integrated access devices (IADs), multiplexers, and a variety of metropolitan area network (MAN) and wide area network (WAN) access devices, and other edge devices. The IoT Center 123 can also oversee management of IoT devices 113 that are connected through the edge devices. The IoT Center 123 can generate and provide an administrative console or user interface for management of the gateway 111, other edge devices, and IoT devices 113 that are connected through the edge devices. The user interface of the IoT Center 123 can be accessed through a client management application 177 or another application 175 of a client device 109, or can be accessed through a network site provided by the IoT center 123 or the management service 120. The IoT center 123 can provide a user interface for setting and viewing alerts and notifications. The alerts and notifications can also be sent to a particular email address or to a particular client device 109.

The IoT center 123 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol. The IoT center 123 can also include an analytics service that provides real-time infrastructure analytics for the gateway 111, other edge devices, and IoT devices 113. The analytics can be generated based on IoT metrics data 191 provided from the gateway 111 or other edge devices. The gateway 111 can provide IoT metrics data 191 based on IoT device 113 communications with the gateway 111. The IoT Center 123 can also provide or utilize the command queue and notification services as discussed above regarding the management service 120, for instance, to in order to provide over-the-air software and policy updates for the gateway 111, other edge devices, and IoT devices 113.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 173 that also includes applications 175, a client management application 177, an onboarding instructions 155, onboarding credentials 178, gateway credentials 154, and other data. In some cases, the onboarding instructions 155 can be included in the client management application 177 or a particular version of the client management application 177. The client device 109 can execute the client management application 177 to perform or access the functionality described for the management system 106, including the management service 120, the onboarding service 121, and the IoT center 123.

Onboarding credentials 178 can be generated by the management service 120 or an authentication service 115, and received in the client device 109 by the client management application 177 or onboarding instructions 155. The onboarding credentials 178 can be limited to operations associated with onboarding of the gateway 111 with the management service 120. The onboarding credentials 178 can be limited by an ACL rule associated with the gateway account 149 when using the onboarding credentials 178. Alternatively or additionally, onboarding credentials 178 can be limited by only enabling the onboarding credentials 178 to authenticate with an enrollment endpoint of the management service 120. The onboarding credentials 178 can include one or more of a token or a certificate for authentication of the client device 109 or the onboarding instructions 155 with the management service 120. In some examples, the token can include a hash message authentication code (HMAC) token, an OAuth token, or a Security Assertion Markup Language (SAML) token. The token can be provided by the management service 120 or an authentication service 115 such as an identity provider. In some examples, the certificate can be a management certificate associated with the management service 120. The management certificate can be verified using an Online Certificate Status Protocol (OCSP) server or by comparison to a certificate revocation list (CRL). The OCSP server or CRL can be part of the management service 120 or an authentication service 115.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 175, such as a client management application 177, a browser application, or another application. The operating system and some applications 175 can access network content served up by the management system 106, or other servers, thereby rendering a user interface on a display, such as a liquid crystal display (LCD), organic light emitting diode (OLED) display, touch-screen display, or other type of display device.

To this end, some applications 175 can include a browser or a dedicated application, and a user interface can include a network page, an application screen, or other interface. The client device 109 can also access web applications using the browser application. Further, other applications 175 can include device management applications, enterprise applications, social networking applications, word processors, spreadsheet applications, media player applications, or other applications. The client management application 177 can be an application that performs certain functions in the onboarding or enrollment of the gateway 111 with the management service 120. The client management application 177 can perform actions as directed by the management service 120, for instance, by checking in with the management service 120, retrieving a command from the command queue, and implementing the command as discussed above.

Gateway onboarding instructions 155 can be utilized by an administrator, technician, or other user to onboard the gateway 111 with the management system 106. The onboarding instructions 155 can utilize the onboarding credentials 178 during an onboarding process in order to authenticate communications between the client device 109 and the management system 106. The onboarding instructions 155 can generate a user interface element through which a user can enter a customer identifier or enterprise identifier. A gateway 111 can include a gateway identifier 181. The gateway identifier 181 can include a bar code, a QR code, or another machine-readable identifier. The gateway identifier 181 can include a serial number or other character string. The onboarding instructions 155 can scan the gateway identifier 181 using a camera device of the client device 109. In some cases, the onboarding instructions 155 can analyze an image captured using the camera device to extract information embedded in the bar code, QR code, or other machine-readable identifier of the gateway identifier 181. The onboarding instructions 155 can analyze an image captured using the camera device by optical character recognition to identify a serial number or other character string of the gateway identifier 181.

The onboarding instructions 155 can transmit the gateway identifier 181 to the management service 120. In response, the management service 120 can generate a gateway account 149 for the gateway 111, and can generate gateway credentials 154. The onboarding instructions 155 can receive the gateway credentials 154 from the management service 120, and can conceal the gateway credentials 154 from users of the client device 109. For example, the gateway credentials 154 can be stored while not being displayed on a display of the client device 109. In addition, the gateway credentials 154 can be stored in a portion of the data store 173 that is inaccessible to users of the client device 109. The onboarding instructions 155 can provide the gateway credentials 154 to the gateway 111. The onboarding instructions 155 can delete the gateway credentials 154 from the client device 109 upon detection of a predetermined event. For example, the predetermined event can be transmission of the gateway credentials 154 to the gateway 111, confirmation from the gateway 111 that the gateway 111 has received the gateway credentials 154, or confirmation from the management service 120 that the gateway 111 has communicated with the management service 120 using the gateway credentials 154.

The gateway 111 can be representative of one or more gateways 111. While referred to as a gateway, the gateway 111 can also be representative of routing switches, integrated access devices (IADs), multiplexers, and a variety of metropolitan area network (MAN) and wide area network (WAN) access devices, and other edge devices. The gateway 111 can perform functionalities and execute applications stored in a data store 183. For example, the gateway 111 can execute a gateway management application 187 and other applications. The gateway management application 187 can include an IoT agent for management and communication with IoT devices 113. The gateway 111 can provide network 119 access to the IoT devices 113, as well as implement enrollment processes and gathering IoT metrics data based on IoT device 113 communications with the gateway 111.

In some examples, gateway management application 187 can receive the gateway credentials 154 from the onboarding instructions 155. The gateway management application 187 can store the gateway credentials 154 in the data store 183. The gateway credentials 154 can be utilized to authenticate the gateway 111 with the management service 120 for communications. The gateway management application 187 can check in with the management service 120, retrieve a command from the command queue of the gateway 111, and implement the command. The command can be a command to install profiles, applications, and other instructions. The profile can be an enrollment profile or another profile for the gateway 111. The application can be a product associated with an IoT device 113, or other products. The management service 120 can determine that the gateway 111 has checked in, and has authenticated using the gateway credentials 154, the management service 120 can transmit a confirmation to the onboarding instructions 155. For example, an indication that the gateway 111 is enrolled, or an indication that the gateway 111 has received the gateway credentials 154.

Once the enrollment process is complete, the gateway management application 187 can indicate completion of the enrollment process, and other status information related to installation and enrollment. The gateway management application 187 can transmit an indication that the gateway 111 is enrolled, or an indication that the gateway 111 has received the gateway credentials 154, to the onboarding instructions 155. The gateway management application 187 can also enable features or functionalities of the now enrolled gateway 111. For example, the gateway management application 187 can enable a network adapter such as a WiFi adapter or 802.11 device to facilitate identifying a MAC address associated with the gateway 111. In some examples, a MAC address of the gateway 111 might be unavailable unless the network adapter has been enabled. In such a scenario, the gateway management application 187 can cause the client device 109 to enable the network adapter and identify a MAC address, IP address, or other device identifier. The gateway management application 187 can store data such as the IoT metrics data 191 on the data store 183. In some instances, the gateway management application 187 can obtain or receive communications from the IoT devices 113, and can generate or aggregate the IoT metrics data 191 using the IoT device 113 communications. The gateway management application 187 can also cause the IoT device 113 to install an IoT management application 197.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can have an operating system or other software that can perform functionalities and execute applications. The operating system can be stored in a data store 193 that also includes applications 195, an IoT management application 197, and other data. The IoT device 113 can execute the IoT management application 197 to perform or access the functionality described for the management system 106, including the management service 120, the onboarding service 121, and the IoT center 123.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT management application 197 can perform actions as directed by the management service 120 and/or the gateway 111. The gateway management application 187 and/or the management service 120 can maintain a command queue for the IoT device 113. The command queue for the IoT device 113 can include actions and commands as discussed. The gateway management application 187 can determine whether states exist on the IoT device 113 that violate one or more of the compliance rules 141 based on status data received from the IoT device 113, or pass status data received from the IoT device 113 to the management service 120 to perform the evaluation. If the IoT device 113 is not in compliance, the gateway management application 187 or the management service 120 can place a command to bring the IoT device 113 into compliance in a command queue for the IoT device 113. The IoT management application 197 can retrieve the command to bring the IoT device 113 into compliance. The IoT management application 197 can implement the command. The management service 120 can place a command for the IoT device 113 in the command queue for the gateway 111. The gateway management application 187 can retrieve the command, and place it in a command queue for the IoT device 113 that is maintained on the gateway 111.

Figure 2:
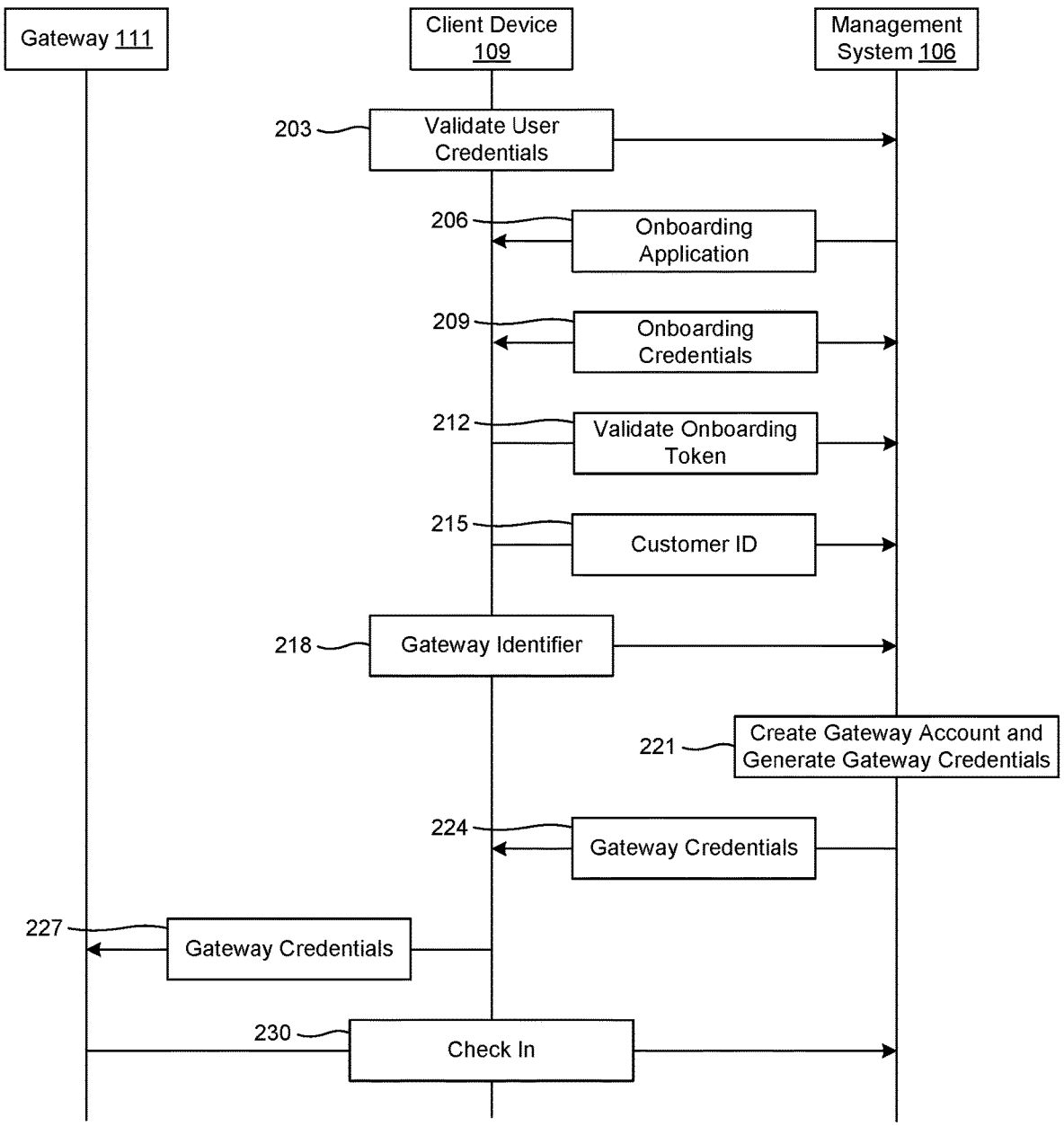
FIG. 2 is a sequence diagram that illustrates functionality implemented by components of the networked environment.

FIG. 2 shows a sequence diagram that illustrates steps performed by components of the networked environment 100. Generally, this process relates to onboarding the gateway 111 with the management service 120. Gateway credentials 154 can be securely provided to the gateway 111 through the client device 109 to authenticate the gateway 111 with the management service 120 for IoT device 113 management operations.

In step 203, the client device 109 can validate user credentials of a technician, administrator, or other user of the client device 109. The user credentials can include one or more of a username, password, one-time password, token, certificate, or other parameters. Validation of user credentials can also include two-factor authentication. A token can include a character string, file, parameter, or other data, and can be linked or associated with a physical token object or hardware token device such as RSA SecurID®. In some examples, the token can be viewed on the hardware device by the user and entered through a user interface element generated by the client management application 177 or another application 175 of the client device 109. In other examples, the token can be provided by proximity to the hardware token device, or a physical connections to the hardware token device. The client management application 177 or another application 175 of the client device 109 can validate the user credentials by transmitting the user credentials to the management service 120, or to authentication services 115. Where the user credentials are transmitted to the management service 120, the management service 120 can compare the user credentials to those stored in user accounts 147 the data store 133, or can relay the user credentials to authentication services 115 for validation. The management service 120 and the authentication services 115 can provide a validation response to the client device 109, and the client management application 177 can confirm that the user credentials are valid.

In step 206, the client device 109 can obtain the onboarding instructions 155. As discussed above, the onboarding instructions 155 can be part of the client management application 177, such as a module for the client management application 177 or a version of the client management application 177 that includes onboarding functionalities. In other cases, the onboarding instructions 155 can be separate from the client management application 177. The management service 120 can place a command to install the onboarding instructions 155 in a command queue for the client device 109 so a customer or enterprise can onboard the gateways 111. The management service 120 can be configured with an identity of a particular user and/or an identity of a particular client device 109 to perform the onboarding of a gateway 111 or a set of gateways 111 for the customer.

The client device 109 can check-in with the management service 120 and retrieve the command to install the onboarding instructions 155 from the command queue for the client device 109. The command to install the onboarding instructions 155 can include a network address from which to download the onboarding instructions 155. The client device 109 can also obtain profiles for the client device 109. A single sign on (SSO) profile can allow the onboarding instructions 155 to share an authentication session with the client management application 177. The client management application 177 can be authenticated for communication with the management service 120 in step 203, and the onboarding instructions 155 can be authenticated with communications with the management service 120 based on a shared authentication session. The shared authentication session can be associated with a group of programs that are signed by a developer signature.

In step 209, the client device 109 can request and receive onboarding credentials 178. The onboarding instructions 155 or the client management application 177 can obtain onboarding credentials 178 including an onboarding certificate and an onboarding token. The onboarding certificate can be associated with a user principle name (UPN) or other user identifier and a universally unique identifier (UUID) or other device identifier that uniquely identifies the client device 109. The onboarding certificate can be a user certificate. The onboarding certificate can be used to refresh an onboarding token. For example, the onboarding token can be valid for a predefined time period such as a day, a week, or any particular number of hours, days, weeks, or months. The onboarding certificate can be valid for a longer time period than the onboarding token. The onboarding credentials 178 can be utilized or required by the management service 120 to authorize onboarding functionalities. In some cases, the onboarding credentials 178 can be limited to onboarding functionalities such as creation of gateway accounts 149, receiving gateway credentials 154, and enrollment of the gateway 111 by installation of a profile on the gateway 111. The onboarding credentials 178 can be utilized to access functionalities through one or more onboarding endpoints of the management service 120. The onboarding functionalities can be provided by the IoT center 123, and the onboarding credentials 178 can provide access to onboarding functionalities through the IoT center 123.

In step 212, the client device 109 can validate the onboarding token. The onboarding token can include a character string, file, parameter, or other data. The onboarding token can be used to authenticate communications between the onboarding instructions 155 and the management service 120. The onboarding instructions 155 can transmit the onboarding token to the management service 120 or authentication service 115 to validate the onboarding token. The management service 120 or authentication service 115 can identify whether the onboarding certificate is revoked or authorized.

The onboarding instructions 155 can also check whether timeout data associated with or included in the onboarding token indicates that the onboarding token is expired. If so, the onboarding instructions 155 can renew or replace the onboarding token. To update the onboarding token, the onboarding instructions 155 can transmit a request to renew the onboarding token to the management service 120 or an authentication service 115. In situations where an onboarding certificate is present, the request can include the onboarding certificate. The onboarding instructions 155 can receive the renewed or updated onboarding token. In situations where an onboarding certificate is not present, the onboarding instructions 155 can generate a prompt or user interface element through which a user can enter user credentials including one or more of a username, password, token, or other parameters. The onboarding instructions 155 can also support two-factor authentication using multiple parameters, which can include obtaining a parameter from a hardware token device by proximity or physical connection to the client device 109. The request to renew the onboarding token can include the provided user credentials and the onboarding instructions 155. The management service 120 or authentication service 115 can identify whether the user account and the user credentials are authorized or revoked, and can transmit the renewed or updated onboarding token. The onboarding instructions 155 can receive the renewed or updated onboarding token.

In step 215, the client device 109 can obtain a customer identifier or enterprise identifier. The onboarding instructions 155 can generate a user interface element through which a customer identifier can be entered by a technician or other user of the client device 109. In some cases, the customer can be selected using a user interface element generated by the onboarding instructions 155. The customer identifier can be used to identify an IP address, FQDN, or other network address for an onboarding endpoint of the management service 120. The onboarding instructions 155 can transmit the customer identifier to the onboarding endpoint of the management service 120. In some situations, the customer identifier can be automatically transmitted to the onboarding instructions 155 by the management service 120 upon authentication of the onboarding instructions 155 with the management service 120.

In some cases, a particular version of the onboarding instructions 155 can be associated with a particular customer. The particular version of the onboarding instructions 155 can include the customer identifier and the network address for an onboarding endpoint of the management service 120. In these cases, the customer identifier does not need to be entered. Based on the user credentials provided for example, in step 203, the particular version of the onboarding instructions 155 can be identified and a command to install the particular version of the onboarding instructions 155 can be placed in the command queue for the client device 109.

In step 218, the client device 109 can obtain a gateway identifier 181. A gateway 111 can include a gateway identifier 181. The gateway identifier 181 can include a bar code, a QR code, or another machine-readable identifier. The gateway identifier 181 can include a serial number or other character string. In some cases, the onboarding instructions 155 can scan the gateway identifier 181 using a camera device or another optical device of the client device 109. The onboarding instructions 155 can capture an image using the camera device. The captured image can be analyzed to extract information embedded in a bar code, QR code, or other machine-readable identifier of the gateway identifier 181. The onboarding instructions 155 can also perform optical character recognition to identify a serial number or other character string of the gateway identifier 181. The onboarding instructions 155 can generate a user interface element through which the gateway identifier 181 can be entered by a technician or other user of the client device 109. This option can be selected through a user interface of the onboarding application, or can be presented if the scan fails to identify a QR code, a bar code, another machine-readable identifier, or a character string through analysis of image data captured through the camera device. Once obtained, the onboarding instructions 155 can transmit the gateway identifier 181 to the management system 106.

In step 221, the management system 106 can create a gateway account 149 for the gateway 111 and generate gateway credentials 154. The gateway identifier 181 and the gateway credentials 154 can be stored in association with a gateway account 149 in the management service 120. Gateway credentials 154 can permit communications with the IoT Center 123 of the management service 120. The gateway credentials 154 can be utilized by the gateway 111, for example, by the gateway management application 187, for authentication with the management service 120 or the IoT Center 123 for management and IoT operations. The gateway credentials 154 can include one or more of a username, a password, a token, a certificate, or other parameters for authentication with the management service 120.

In step 224, the management system 106 can transmit the gateway credentials 154 to the client device 109. The gateway onboarding instructions 155 can receive the gateway credentials 154. To increase security, the gateway onboarding instructions 155 can conceal gateway credentials 154 from users of the client device 109. For example, onboarding instructions 155 can store the gateway credentials 154 while not being displayed on a display of the client device 109. In addition, the gateway credentials 154 can be encrypted or stored in a portion of the data store 173 that is encrypted or otherwise inaccessible to users of the client device 109. In some situations, the management service 120 can also transmit the gateway management application 187 or a network location to download the gateway management application 187.

In step 227, the client device 109 can transmit the gateway credentials 154 to the gateway 111. The client device 109 can establish communications with the gateway 111. A user can power-on the gateway 111. The gateway 111 can provide for initial setup once powered on. The gateway 111 can broadcast or connect to a Bluetooth® or WiFi, or another wireless networking signal upon startup. The onboarding instructions 155 can establish a connection with the gateway 111 through the wireless networking signal, for example, by connecting to the wireless networking signal, or by pairing with the gateway 111. The onboarding instructions 155 can also establish a physical or wired connection with the gateway 111 through a networking port of the gateway 111. The onboarding instructions 155 can then transmit the gateway credentials 154 to the gateway 111. In some situations, the onboarding instructions 155 can also cause the gateway management application 187 to be installed on the gateway 111. For example, the onboarding instructions 155 can transmit the gateway management application 187 to the gateway 111 or transmit a command to install the gateway management application 187 along with a network location to download the gateway management application 187. Alternatively, the gateway management application 187 can be preinstalled on the gateway 111.

The onboarding instructions 155 can delete the gateway credentials 154 from the client device 109 upon detection of a predetermined event. For example, the predetermined event can be transmission of the gateway credentials 154 to the gateway 111, confirmation from the gateway 111 that the gateway 111 has received the gateway credentials 154, or confirmation from the management service 120 that the gateway 111 has communicated with the management service 120 using the gateway credentials 154.

In step 230, the gateway 111 can check in with the management system 106. The gateway management application 187 can authenticate using the gateway credentials 154. The gateway management application 187 can then retrieve commands stored in a command queue for the gateway 111 by the management service 120. The commands can include a command to install an enrollment policy on the gateway 111. The commands can also include commands to install products, policies, and services associated with the IoT devices 113.

Figure 3:
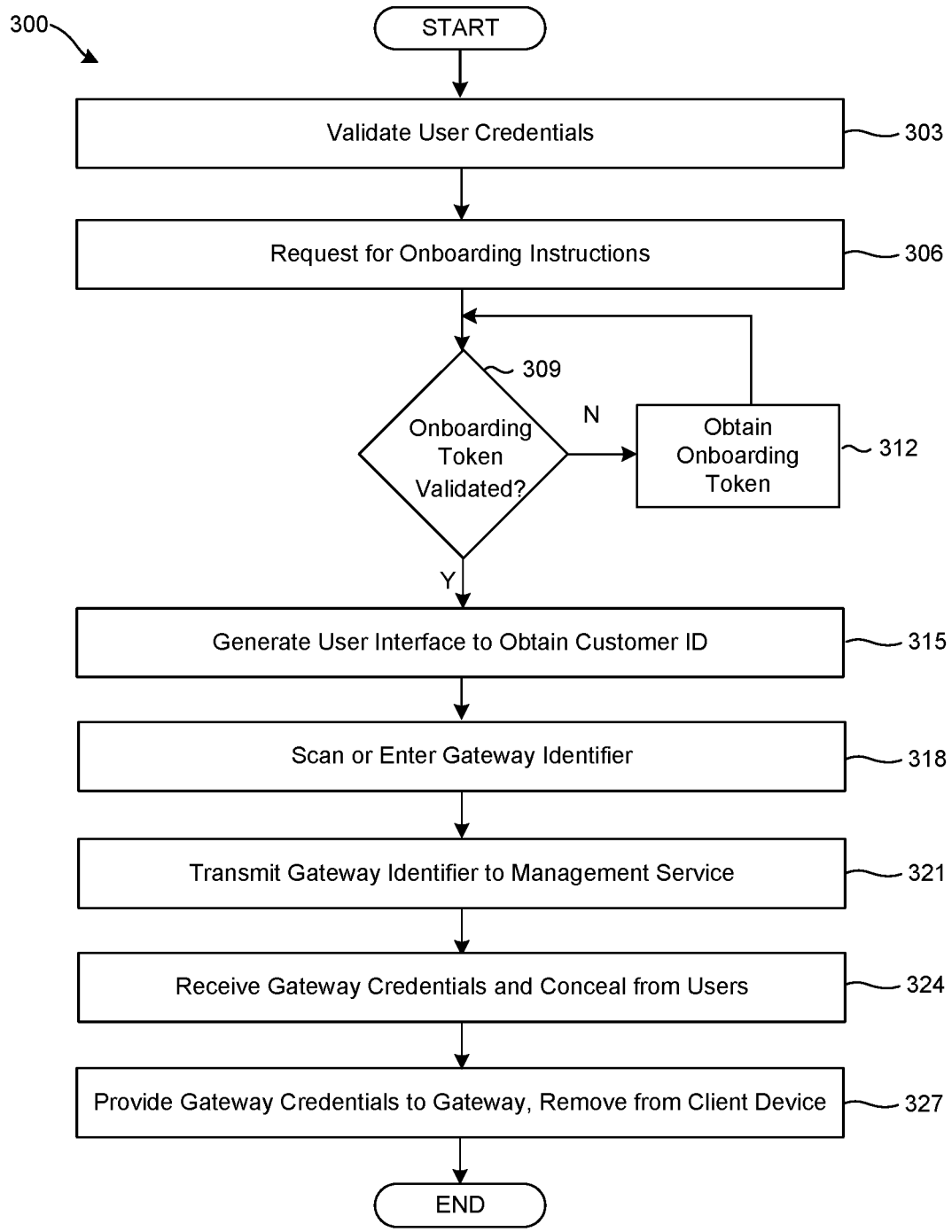
FIGS. 3 and 4 are flowcharts that illustrates functionality implemented by components of the networked environment.

FIG. 3 shows a flowchart 300 that illustrates an example of the operation of instructions executed by the client device 109. The instructions can include the client management application 177, the onboarding instructions 155, and other applications 175 executed by the client device 109. FIG. 3 illustrates an example of how the client device 109 can be utilized to onboard the gateway 111 with the management service 120. Gateway credentials 154 can be securely provided to the gateway 111 to authenticate the gateway 111 with the management service 120 for IoT device 113 management operations.

In step 303, the client management application 177 can validate user credentials. The user credentials can include one or more of a username, password, token, certificate, or other parameters. Validation of user credentials can also include two-factor authentication, for example, using a physical token object or hardware token device. In some examples, the token can be entered through a user interface element generated by the client management application 177 or another application 175 of the client device 109. In other examples, the token can be provided by physical or wireless connection to the hardware token device. The client management application 177 can validate the user credentials by transmitting the user credentials to the management service 120. The management service 120 can compare the user credentials to those stored in user accounts 147 the data store 133, or can relay the user credentials to authentication services 115 for validation. The management service 120 can provide a validation response to the client device 109, and the client management application 177 can confirm that the user credentials are valid.

In step 306, the client management application 177 can transmit a request for the onboarding instructions 155. The client management application 177 can receive the onboarding instructions 155 and install it. In some situation, the request for the onboarding instructions 155 can cause the client management application to obtain the user credentials, or determine that the user credentials are valid if obtained within a predetermined time. In response to the request for onboarding instructions 155, the management service 120 can place a command to install the onboarding instructions 155 in a command queue for the client device 109. The client management application 177 can check-in with the management service 120 and retrieve the command to install the onboarding instructions 155 from the command queue for the client device 109. The command to install the onboarding instructions 155 can include a network address from which to download the onboarding instructions 155. The onboarding instructions 155 can be an updated version of the client management application 177, or can be a separate application.

The client management application 177 can also obtain profiles for the client device 109. A single sign on (SSO) profile can allow the onboarding instructions 155 to share an authentication session with the client management application 177 where they are separate applications. The client management application 177 can be authenticated for communication with the management service 120 in step 203, and the onboarding instructions 155 can be authenticated with communications with the management service 120 based on a shared authentication session. The shared authentication session can be associated with a group of programs that are signed by a developer signature. The client management application 177 can also receive an onboarding certificate. The onboarding certificate can be associated with a user principle name (UPN) or other user identifier and a universally unique identifier (UUID) or other device identifier that uniquely identifies the client device 109. The onboarding certificate can be used to refresh an onboarding token. For example, the onboarding token can be valid for a predefined time period such as a day, a week, or any particular number of hours, days, weeks, or months. The onboarding certificate can be valid for a longer time period than the onboarding token.

In step 309, the onboarding instructions 155 determine whether an onboarding token can be validated. The onboarding token can include a character string, file, parameter, or other data. The onboarding token can be used to authenticate communications between the onboarding instructions 155 and the management service 120. The onboarding instructions 155 can determine whether there is an onboarding token stored in the data store 173. If there is no onboarding token stored in the data store 173, the onboarding instructions 1555 the onboarding token cannot be validated, and the onboarding application moves to step 312 and obtains an onboarding token. If there is an onboarding token stored in the data store 173, then the onboarding instructions 155 can determine whether the onboarding token has timed out based on timeout data that is associated with or included in the onboarding token. If the timeout date indicates that the onboarding token has timed out, then the onboarding token cannot be validated, and the onboarding instructions 155 can obtain an onboarding token in step 312 by refreshing or updating the onboarding token.

If there is an onboarding token stored in the data store 173, and the timeout data indicates that the onboarding token is usable or not expired, then the onboarding instructions 155 can transmit the onboarding token to the management service 120 or authentication service 115 to validate the onboarding token. The management service 120 or authentication service 115 can identify whether the onboarding token is revoked or authorized based on data stored by the management service 120 or authentication service 115.

In step 312, the onboarding instructions 155 can obtain an onboarding token. The onboarding token that is obtained can be considered a refreshed, renewed, or updated onboarding token where an onboarding token was stored in the data store 173 before moving to step 312.

To obtain the onboarding token, the onboarding instructions 155 can transmit a request to obtain the onboarding token to the management service 120 or an authentication service 115. The request can include the onboarding certificate, for example, if the onboarding credentials 178 include an onboarding certificate. The management service 120 or authentication service 115 can validate the onboarding certificate by identifying whether the onboarding certificate is revoked or authorized. The onboarding instructions 155 can receive the onboarding token, which can be a refreshed or updated onboarding token.

In situations where an onboarding certificate is not included in the onboarding credentials 178, the onboarding instructions 155 can generate a prompt or user interface element through which a user can enter user credentials including one or more of a username, password, token, or other parameters. The onboarding instructions 155 can also support two-factor authentication using multiple parameters, which can include obtaining a parameter from a hardware token device by proximity or physical connection to the client device 109. The request to renew the onboarding token can include the provided user credentials and the onboarding instructions 155. The management service 120 or authentication service 115 can identify whether the user account and the user credentials are authorized or revoked for onboarding operations, The management service 120 or authentication service 115 can transmit the onboarding token if the user account and the user credentials are authorized for onboarding operations. The onboarding instructions 155 can receive the renewed or updated onboarding token.

In step 315, the onboarding instructions 155 can obtain a customer identifier or enterprise identifier. The onboarding instructions 155 can generate a user interface element through which a customer identifier can be entered by a technician or other user of the client device 109. The customer identifier can be used to identify an IP address, FQDN, or other network address for an onboarding endpoint of the management service 120. The onboarding instructions 155 can transmit the customer identifier to the onboarding endpoint of the management service 120. The onboarding instructions 155 can also generate a user interface element through which the network address for an onboarding endpoint of the management service 120 is entered, for example, where the network address is not identified based on the customer or identifier. Alternatively, the customer identifier and/or the network address of the management service 120 can be automatically transmitted to the onboarding instructions 155 by the management service 120 upon authentication of the onboarding instructions 155 with the management service 120.

In step 318, the onboarding instructions 155 can obtain a gateway identifier 181. The onboarding instructions 155 can scan the gateway identifier 181 using a camera device or another optical device of the client device 109. The onboarding instructions 155 can capture an image using the camera device. The captured image can be analyzed to extract information embedded in a bar code, QR code, or other machine-readable identifier of the gateway identifier 181. The onboarding instructions 155 can also perform optical character recognition to identify a serial number or other character string of the gateway identifier 181.

The onboarding instructions 155 can also generate a user interface element through which the gateway identifier 181 can be entered by a technician or other user of the client device 109. This option can be selected through a user interface of the onboarding application, or can be presented if the scan fails to identify a QR code, a bar code, another machine-readable identifier, or a character string through analysis of image data captured through the camera device. Once obtained, the onboarding instructions 155 can transmit the gateway identifier 181 to the management system 106.

In step 321, the onboarding instructions 155 can transmit the gateway identifier 181 to the management service 120. In some cases, this can be considered a request for gateway credentials 154 or a request to create a gateway account 149 with the management service 120. The request for gateway credentials 154 can include the gateway identifier 181 of the gateway 111 and can be authenticated with the management service 120 using the onboarding credentials 178, which can include the onboarding token. In some situations, the onboarding instructions 155 can also transmit a request for the gateway management application 187 to the management service 120. The management service 120 can provide a network location to download the gateway management application 187, for example, through a command placed in a command queue.

In step 324, the onboarding instructions 155 can receive the gateway credentials 154. Gateway onboarding instructions 155 can conceal gateway credentials 154 from users. For example, onboarding instructions 155 can store the gateway credentials 154 while not being displayed on a display of the client device 109. The gateway credentials 154 can be encrypted or stored in a portion of the data store 173 that is encrypted or otherwise inaccessible to users of the client device 109. In some cases, the gateway credentials 154 can be temporarily stored and removed from the client device upon the detection of a particular event.

In step 327, the onboarding instructions 155 can transmit the gateway credentials 154 to the gateway 111. The onboarding instructions 155 can establish communications with the gateway 111. A user can power-on the gateway 111. The gateway 111 can broadcast or connect to a Bluetooth® or WiFi, or another wireless networking signal upon powering on. The onboarding instructions 155 can establish a connection with the gateway 111 through the wireless networking signal, for example, by connecting to the wireless networking signal, or by pairing with the gateway 111. The onboarding instructions 155 can also establish a physical or wired connection with the gateway 111 through a networking port of the gateway 111. The onboarding instructions 155 can then transmit the gateway credentials 154 to the gateway 111. In some situations, the onboarding instructions 155 can also cause the gateway management application 187 to be installed on the gateway 111. For example, the onboarding instructions 155 can transmit the gateway management application 187 to the gateway 111 or transmit a command to install the gateway management application 187 along with a network location to download the gateway management application 187. Alternatively, the gateway management application 187 can be preinstalled on the gateway 111.

The onboarding instructions 155 can delete the gateway credentials 154 from the client device 109 upon detection of a predetermined event. For example, the predetermined event can be transmission of the gateway credentials 154 to the gateway 111, confirmation from the gateway 111 that the gateway 111 has received the gateway credentials 154, or confirmation from the management service 120 that the gateway 111 has communicated with the management service 120 using the gateway credentials 154.

Figure 4:
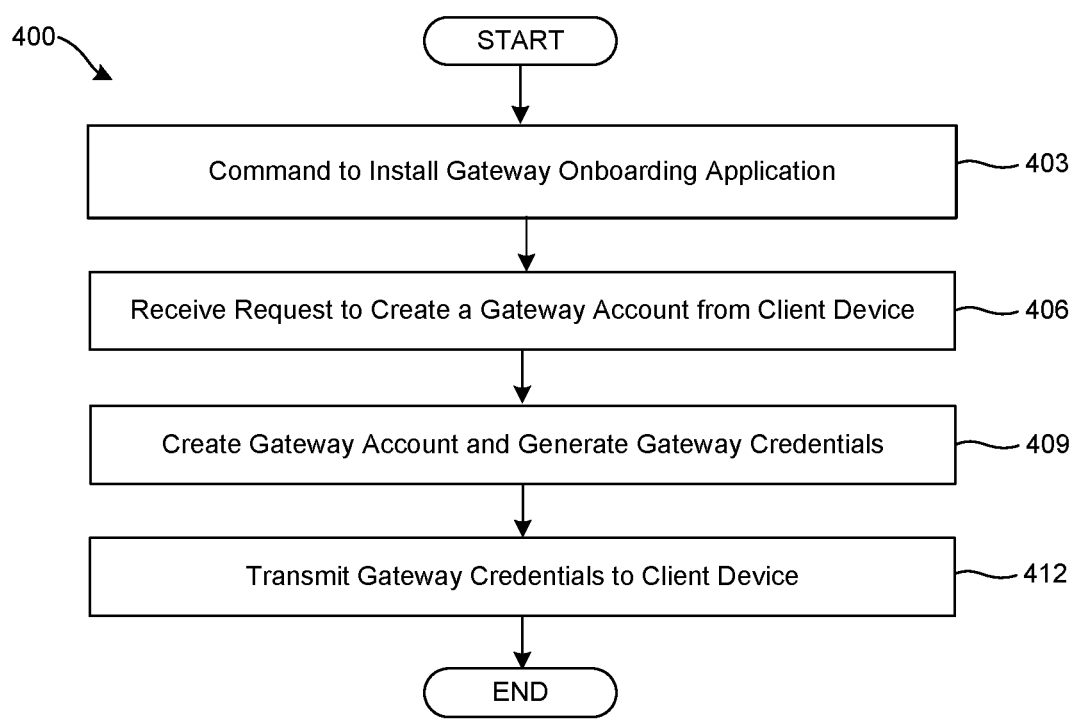

FIG. 4 shows a flowchart 400 that illustrates an example of the operation of the management service 120 for onboarding the gateway 111 with the management service 120. Gateway credentials 154 can be securely provided to the gateway 111 using the client device 109. The gateway credentials 154 can authenticate the gateway 111 with the management service 120 for IoT device 113 management operations.

In step 403, the management service 120 can place a command to install a gateway onboarding instructions 155 in a command queue for the client device 109. The command to install the gateway onboarding instructions 155 can include a network address from which the gateway onboarding instructions 155 can be downloaded. In some situations, the management service 120 determines that a user of the client device 109, or the client device 109, is authorized or scheduled to onboard a gateway 111 or a set of gateways 111 with the management service 120.

The management service 120 can make the determination based on user credentials including one or more of a username, password, token, certificate, or other parameters. Validation of user credentials can also include two-factor authentication, for example, using a physical token object or hardware token device. The management service 120 can compare the user credentials to those stored in user accounts 147 the data store 133, or can relay the user credentials to authentication services 115 for validation. The management service 120 can provide a validation response to the client device 109, and the client management application 177 can confirm that the user credentials are valid. In some cases, the management service 120 also determines whether the user account 147 or user credentials are indicated in a list, table or other onboarding schedule stored in the data store 133 for onboarding of a gateway 111 or a set of gateways 111.

In step 406, the management service 120 can receive a request to create a gateway account 149 from a client device 109. The request to create a gateway account 149 can include a gateway identifier 181 of a gateway 111. The request to create a gateway account 149 can be authenticated using onboarding credentials 178 received along with the request. The management service 120 can determine that the onboarding credentials 178 are valid. In some cases, the management service 120 determines whether the onboarding credentials 178 are valid by transmitting the onboarding credentials 178 to an authentication service 115 such as an identity provider or a CRL service and receiving a validation response that indicates whether the onboarding credentials 178 are valid.

In step 409, the management service 120 can create a gateway account 149 for the gateway 111. The gateway account 149 can be associated with the gateway identifier 181. The management service 120 can generate the gateway credentials 154. The gateway credentials 154 can be utilized to authenticate the gateway 111 with the management service 120. The gateway identifier 181 and the gateway credentials 154 can be stored in association with a gateway account 149 in the management service 120. Gateway credentials 154 can permit communications with the IoT Center 123 of the management service 120. The gateway credentials 154 can be utilized by the gateway 111 for authentication with the management service 120 or the IoT Center 123 for management and IoT operations. The gateway credentials 154 can include one or more of a username, a password, a token, a certificate, or other parameters for authentication with the management service 120.

In step 412, the management service 120 can transmit the gateway credentials 154 to the client device 109. The gateway credentials 154 can include a username and a password. The username and password of the gateway credentials can be generated by the management service 120. The gateway credentials 154 can also include a token, a certificate, or other parameters for authentication of the gateway with the management service 120. The token of the gateway credentials can include an HMAC token, an OAuth token, or a SAML token. The token can be generated and provided to the client device 109 by the management service 120 or an authentication service 115. In some examples, the certificate can be a management certificate associated with the management service 120. The management certificate can be verified using an OCSP server or by comparison to a CRL. The OCSP server or CRL can be part of the management service 120 or an authentication service 115.

Figure 5A:
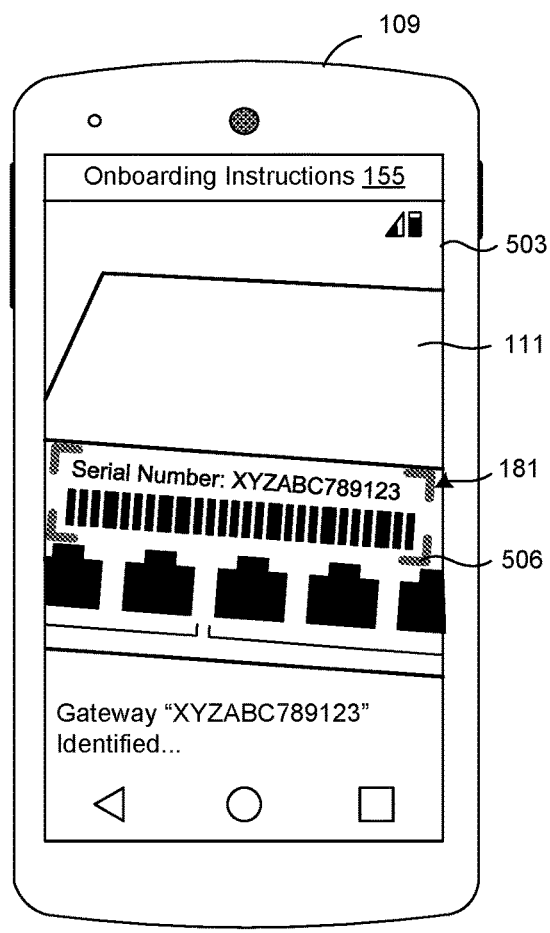
FIGS. 5A and 5B are drawings that illustrate functionality implemented by components of the networked environment and rendered on a display.

FIG. 5A shows an example illustration of a user interface 503 of the onboarding instructions 155 rendered for display on a display of the client device 109. The onboarding instructions 155 can obtain image data using a camera device of the client device 109. The onboarding instructions 155 can scan or analyze the image data to identify a gateway identifier 181 of a gateway 111. In some cases, the onboarding instructions 155 can display the image data in the user interface 503. The onboarding instructions 155 can also indicate whether the gateway identifier 181 is identified, and can display the gateway identifier 181 that is identified. In some cases, a user interface element 506 can indicate an area of the image data that includes the gateway identifier 181 that is identified, or an area of the image data that appears to include a gateway identifier 181.

Figure 5B:
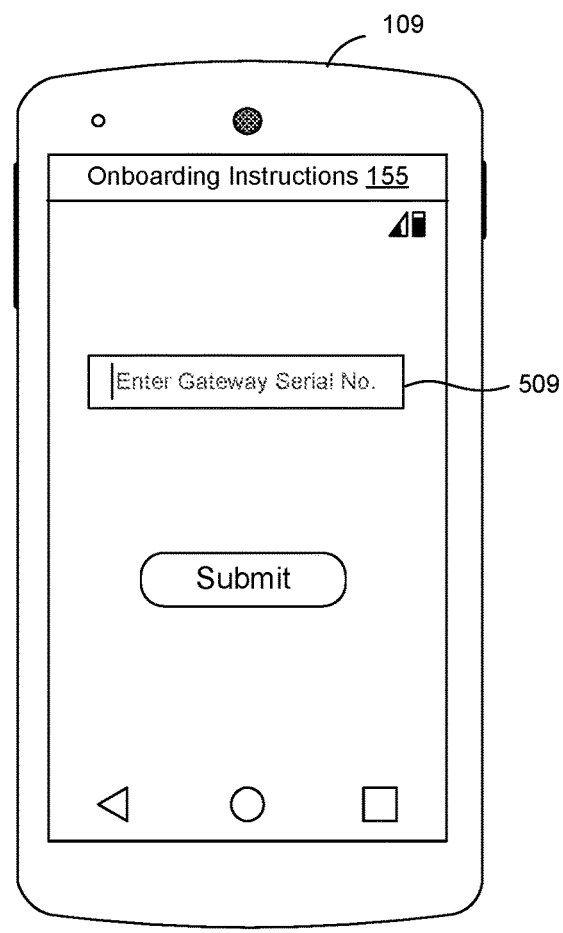

FIG. 5B shows an example illustration of a user interface 503 of the onboarding instructions 155 rendered for display on a display of the client device 109. The onboarding instructions 155 can also generate a user interface element 509 that prompts the user to "Enter Gateway Serial No." The gateway identifier 181 can be entered through the user interface element 509 by a user. In some cases, the user interface 503 can be updated to include the user interface element 509 if the onboarding instructions 155 fails to identify the gateway identifier 181 using image data captured through the camera device of the client device 109.

The IoT devices 113, gateways 111, client devices 109, and devices comprising the management system 106 can include at least one processor circuit, for example, having a processor and at least one memory device, both of which couple to a local interface, respectively. The device can include, for example, at least one computer, a mobile device, smartphone, computing device, server device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices comprising the management system 106 can include a display upon which user interfaces can be rendered, including the user interfaces 503 and 600. The IoT devices 113, gateways 111, client devices 109, and devices comprising the management system 106 can also include one or more input/output devices that can include, for example, a capacitive touchscreen or other type of touch input device, fingerprint reader, or keyboard.

Although the management service 120, client management application 177, gateway management application 187, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device of a client device; and
   a data store of the client device, the data store comprising instructions executable by the at least one computing device, wherein the instructions, when executed, cause the at least one computing device to:
      retrieve an onboarding token using a request for the onboarding token that is authenticated based on user credentials associated with a user account with a management service;
      cause a gateway account to be created using a request to create the gateway account, wherein the request to create the gateway account is transmitted to the management service, wherein the request to create the gateway account comprises a gateway identifier that uniquely identifies a gateway, and wherein the request to create the gateway account is authenticated based on the onboarding token;

relay gateway credentials for the gateway account from the management service to the gateway, wherein the gateway credentials authenticate communications between the gateway and the management service, and wherein the gateway credentials are stored in the data store of the client device and concealed from users of the client device; and remove the gateway credentials from the data store based on an event comprising at least one of: a transmission of the gateway credentials to the gateway, a confirmation from the gateway that the gateway credentials are received by the gateway, or a confirmation from the management service that the gateway has checked in using the gateway credentials.

2. The system of claim 1, wherein the instructions, when executed, further cause the at least one computing device to:
capture image data that depicts the gateway, wherein the image data is captured by a camera device of the client device; and
analyze the image data to identify the gateway identifier of the gateway.

3. The system of claim 2, wherein the gateway identifier is identified based on a machine-readable identifier in the image data, and wherein the gateway identifier is encoded in the machine-readable identifier.

4. The system of claim 2, wherein the gateway identifier is identified based on optical character recognition of characters in the image data.

5. The system of claim 1, wherein the gateway credentials comprise a username and password associated with the gateway account.

6. The system of claim 1, wherein the gateway credentials comprise a certificate associated with the management service.

7. The system of claim 1, wherein the instructions, when executed, further cause the at least one computing device to:
determine that the onboarding token is expired based on timeout data associated with the onboarding token; and
obtain an updated onboarding token based on a certificate associated with a user identifier and a device identifier that uniquely identifies the client device.

8. A non-transitory computer-readable medium embodying instructions executable in at least one computing device of a client device wherein the instructions, when executed, cause the at least one computing device to:
retrieve an onboarding token using a request for the onboarding token that is authenticated based on user credentials associated with a user account with a management service;
cause a gateway account to be created using a request to create the gateway account, wherein the request to create the gateway account is transmitted to the management service, wherein the request to create the gateway account comprises a gateway identifier that uniquely identifies a gateway, and wherein the request to create the gateway account is authenticated based on the onboarding token;
relay gateway credentials for the gateway account from the management service to the gateway, wherein the gateway credentials authenticate communications between the gateway and the management service, and wherein the gateway credentials are stored in a data store of the client device and concealed from users of the client device; and
remove the gateway credentials from the data store based on an event comprising at least one of: a transmission of the gateway credentials to the gateway, a confirmation from the gateway that the gateway credentials are received by the gateway, or a confirmation from the management service that the gateway has checked in using the gateway credentials.

9. The non-transitory computer-readable medium of claim 8, wherein the instructions, when executed, further cause the at least one computing device to:
capture image data that depicts the gateway, wherein the image data is captured by a camera device of the client device; and
analyze the image data to identify the gateway identifier of the gateway.

10. The non-transitory computer-readable medium of claim 9, wherein the gateway identifier is identified based on a machine-readable identifier in the image data, and wherein the gateway identifier is encoded in the machine-readable identifier.

11. The non-transitory computer-readable medium of claim 9, wherein the gateway identifier is identified based on optical character recognition of characters in the image data.

12. The non-transitory computer-readable medium of claim 8, wherein the gateway credentials comprise a username and password associated with the gateway account.

13. The non-transitory computer-readable medium of claim 8, and wherein the gateway credentials comprise a certificate associated with the management service.

14. A method implemented using a client device, the method comprising:
retrieving an onboarding token using a request for the onboarding token that is authenticated based on user credentials associated with a user account with a management service;
causing a gateway account to be created using a request to create the gateway account, wherein the request to create the gateway account is transmitted to the management service, wherein the request to create the gateway account comprises a gateway identifier that uniquely identifies a gateway, and wherein the request to create the gateway account is authenticated based on the onboarding token; and
relaying gateway credentials for the gateway account from the management service to the gateway, wherein the gateway credentials authenticate communications between the gateway and the management service, and wherein the gateway credentials are stored in a data store of the client device and concealed from users of the client device; and
removing the gateway credentials from the data store based on an event comprising at least one of: a transmission of the gateway credentials to the gateway, a confirmation from the gateway that the gateway credentials are received by the gateway, or a confirmation from the management service that the gateway has checked in using the gateway credentials.

15. The method of claim 14, further comprising:
capturing image data that depicts the gateway, wherein the image data is captured by a camera device of the client device; and
analyzing the image data to identify the gateway identifier of the gateway.

16. The method of claim 15, wherein the gateway identifier is identified based on a machine-readable identifier in the image data, and wherein the gateway identifier is encoded in the machine-readable identifier.

17. The method of claim 15, wherein the gateway identifier is identified based on optical character recognition of characters in the image data.

18. The method of claim 14, wherein the gateway credentials comprise a username and password associated with the gateway account.

19. The method of claim 14, wherein the gateway credentials comprise a certificate associated with the management service.

20. The method of claim 14, further comprising:
 determining that the onboarding token is expired based on timeout data associated with the onboarding token; and
 obtaining an updated onboarding token based on a certificate associated with a user identifier and a device identifier that uniquely identifies the client device.

* * * * *